United States Patent
Jung

(10) Patent No.: US 9,329,330 B2
(45) Date of Patent: May 3, 2016

(54) BACKLIGHT UNIT AND LIQUID CRYSTAL DISPLAY HAVING THE SAME

(71) Applicant: Samsung Electronics Co., Ltd, Suwon-si, Gyeonggi-do (KR)

(72) Inventor: Sung Soo Jung, Suwon-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 60 days.

(21) Appl. No.: 14/282,483

(22) Filed: May 20, 2014

(65) Prior Publication Data

US 2014/0254198 A1 Sep. 11, 2014

Related U.S. Application Data

(63) Continuation of application No. 12/632,894, filed on Dec. 8, 2009, now Pat. No. 8,767,143.

(30) Foreign Application Priority Data

Dec. 30, 2008 (KR) .................. 10-2008-0136259

(51) Int. Cl.
*F21V 8/00* (2006.01)
*G02F 1/1335* (2006.01)

(52) U.S. Cl.
CPC ............ *G02B 6/0083* (2013.01); *G02B 6/0073* (2013.01); *G02F 1/133608* (2013.01); *G02F 2001/133612* (2013.01)

(58) Field of Classification Search
CPC .................... G02F 1/133608; G02F 1/133615; G02B 6/0083; G02B 6/0091
See application file for complete search history.

(56) References Cited

U.S. PATENT DOCUMENTS 7,463,325 B2 12/2008 Oohira
7,576,811 B2 8/2009 Kazushige
(Continued)

FOREIGN PATENT DOCUMENTS

EP 1933194 6/2008
FR 20060059480 6/2006
(Continued)

OTHER PUBLICATIONS

European Search Report issued Feb. 24, 2010 in EP Application No. 09178714.3.
Korean Office Action issued May 11, 2010 in KR Application No. 2008-01326259.
European Office Action issued Jun. 9, 2011 in EP Application No. 09178714.3.
U.S. Notice of Allowance mailed Feb. 19, 2014 in related U.S. Appl. No. 12/632,894.
(Continued)

*Primary Examiner* — Huyen Ngo
(74) *Attorney, Agent, or Firm* — Staas & Halsey LLP

(57) ABSTRACT

A backlight unit and a liquid crystal display having the same. The backlight unit includes a lower cover, an interconnection coupling hole, an inverter board, and an interconnection. The lower cover accommodates a printed circuit board, which mounts at least one light emitting diode thereon and is provided at one side thereof with a first connector. The interconnection coupling hole is formed in a bottom surface of the lower cover at a position corresponding to the first connector. The inverter board is disposed on a rear surface of the lower cover to apply a driving voltage to the at least one light emitting diode. The interconnection is provided at one end thereof with a second connector to electrically connect the printed circuit board to the inverter board. A coupling part of the first connector coupled to the second connector is directed to the interconnection coupling hole, so the assembling time of the backlight unit and the liquid crystal display is reduced, thereby improving the productivity of the backlight unit and the liquid crystal display.

37 Claims, 5 Drawing Sheets

(56) References Cited

U.S. PATENT DOCUMENTS

| | | |
|---|---|---|
| 7,837,377 B2 | 11/2010 | Lee et al. |
| 7,859,613 B2 | 12/2010 | Kim |
| 7,864,258 B2 | 1/2011 | Cho et al. |
| 7,976,183 B2 | 7/2011 | Park et al. |
| 2007/0165425 A1 | 7/2007 | Sakamoto et al. |
| 2008/0094535 A1 | 4/2008 | Suh et al. |
| 2008/0266905 A1 | 10/2008 | Yeh |
| 2008/0297701 A1 | 12/2008 | Lee et al. |
| 2013/0308074 A1* | 11/2013 | Park ............ G02B 6/0088 349/58 |
| 2015/0098025 A1* | 4/2015 | Mouri ............ H04N 5/64 348/790 |
| 2015/0103259 A1* | 4/2015 | Gotou ............ G02B 6/0081 348/790 |

FOREIGN PATENT DOCUMENTS

| | | |
|---|---|---|
| KR | 2007-121908 | 12/2007 |
| KR | 2008-20855 | 3/2008 |
| KR | 2008-54555 | 6/2008 |

OTHER PUBLICATIONS

U.S. Office Action mailed Aug. 19, 2013 in related U.S. Appl. No. 12/632,894.

U.S. Restriction Requirement mailed Apr. 3, 2013 in related U.S. Appl. No. 12/632,894.

U.S. Appl. No. 12/632,894, filed Dec. 8, 2009, Sung Soo Jung, Samsung Electronics Co., Ltd.

European Decision on Grant issued Dec. 7, 2015 in corresponding European Patent Application 14 164 081.3.

* cited by examiner

BACKLIGHT UNIT AND LIQUID CRYSTAL DISPLAY HAVING THE SAME

CROSS-REFERENCE TO RELATED APPLICATIONS

This application is a Continuation Application of prior application Ser. No. 12/632,894, filed on Dec. 8, 2009 in the United States Patent and Trademark Office, which claims priority under 35 U.S.C. §119 of Korean Patent Application No. 10-2008-0136259, filed on Dec. 30, 2008, in the Korean Intellectual Property Office, the disclosure of which is incorporated herein by reference.

BACKGROUND

1. Field of the Invention

The present general inventive concept relates to a backlight unit and a liquid crystal display having the same. More particularly, the present general inventive concept relates to a backlight unit to improve efficiency and reliability through an interconnection structure, which applies power to a printed circuit board on which a light emitting diode is mounted, and a liquid crystal display having the same.

2. Description of the Related Art

A liquid crystal display (LCD) displays images using electrical and optical properties of liquid crystal. Since the LCD has advantages of slimness, lightweight, low power consumption, and low driving voltage as compared with other display apparatuses, the LCD has been extensively employed in various industrial fields.

The LCD includes a liquid crystal display panel, in which liquid crystal is interposed between two transparent substrates and voltage is usable with the liquid crystal to change a direction of liquid crystal molecules to optically display images, and a backlight assembly for providing light to the liquid crystal display panel.

A CCFL (Cold Cathode Fluorescent Lamp), an EEFL (External Electrode Fluorescent Lamp), and an FFL (Flat Fluorescent Lamp) are used as light sources of the backlight assembly. However, the CCFL represents limitations in terms of high definition, light weight, slim structure and compact size, so an LED (Light Emitting Diode) has been recently used as the light source of the backlight assembly because the LED represents improved performance such as high brightness, long life span, and high color purity. In addition, as restriction on dumping of dangerous substances, such as mercury, have become widely enforced, the CCFL is less used, and the LED, which is an environmentally friendly device, is widely used instead of the CCFL.

The backlight assembly having such an LED as the light source is classified into a direct-type backlight assembly and an edge-type backlight assembly according to the arrangement of the LED and the type of the light guide plate. The direct-type backlight assembly having the LED has a structure in which the LED is disposed in front of the backlight assembly, so the direct-type backlight assembly has a difficulty in achieving slimness and requires a large number of LEDs, increasing the manufacturing cost.

In contrast, the edge-type backlight assembly has a structure in which the LED is mounted at both sides of the backlight assembly and light is introduced into the front surface of the backlight assembly through a light guide plate, so the edge-type backlight assembly may have a thickness smaller than that of the direct-type backlight assembly, thereby realizing the slimness structure.

A backlight unit provided with the LED includes a box-shape bottom chassis having an open upper surface to sequentially receive a reflection plate, the light guide plate, and optical sheets therein. In addition, a plurality of LEDs mounted on the printed circuit board are provided adjacent to a side of the light guide plate in the backlight unit.

The LEDs are connected to an inverter board, which is mounted on a rear surface of the bottom chassis, through a wire or an interconnection to receive drive voltage, so the LEDs emit light.

In general, the printed circuit board, on which the LEDs are mounted, is connected to the interconnection inside the bottom chassis, so extra space for such a connection is required. In addition, when the backlight assembly is coupled to the bottom chassis, short circuit or ground failure of the interconnection connected to the printed circuit board may occur. In this case, the backlight assembly needs to be separated from the bottom chassis and then connected to the bottom chassis again. Accordingly, the assembling work is complicated and the working time is increased.

SUMMARY

Accordingly, it is a feature of the present general inventive concept to provide a backlight unit, capable of improving assembling efficiency and reliability of the liquid crystal display, and a liquid crystal display having the same.

Additional features and/or advantages of the present general inventive concept will be set forth in part in the description which follows and, in part, will be apparent from the description, or may be learned by practice of the general inventive concept.

Embodiments of an exemplary embodiment of the present general inventive concept are achieved by providing a backlight unit. The backlight unit may include a lower cover, an interconnection hole, an inverter board, and an interconnection. The lower cover may accommodate a printed circuit board, which mounts at least one light emitting diode thereon and is provided at one side thereof with a first connector. The interconnection coupling hole is formed in a bottom surface of the lower cover at a position corresponding to the first connector. The inverter board is disposed on a rear surface of the lower cover to apply a driving voltage to the at least one light emitting diode. The interconnection may be provided at one end thereof with a second connector to electrically connect the printed circuit board to the inverter board. A coupling part of the first connector coupled to the second connector may be directed to the interconnection coupling hole.

The second connector is coupled to the first connector through the interconnection coupling hole.

The first connector may be provided in a socket type and the second connector may be provided in a plug type.

The printed circuit board is fixed to a fixing member, which is provided on the lower cover and may include thermal conductive metal.

The coupling part of the first connector protrudes through the interconnection coupling hole.

Embodiments of another exemplary embodiment of the present general inventive concept provide a backlight unit. The backlight unit may include a light guide plate, a printed circuit board, a lower cover, and an inverter board. At least one light emitting diode radiating light to one side surface of the light guide plate is mounted on the printed circuit board. The lower cover accommodates the light guide plate and the printed circuit board therein. The inverter board is disposed at a rear surface of the lower cover to apply a driving voltage to the light emitting diode. An interconnection coupling hole may be formed at one side of a bottom surface of the lower cover, and an interconnection for electrical connection between the printed circuit board and the inverter board passes through the interconnection coupling hole to connect the printed circuit board to the inverter board.

A plug-type connector may be provided at one end of the interconnection connected to the printed circuit board, and a socket-type connector having a coupling part, into which the plug type connector is inserted, may be provided on the printed circuit board.

The interconnection coupling hole is formed at a position corresponding to the plug type connector, and the coupling part is directed to the interconnection coupling hole.

Embodiments of another exemplary embodiment of the present general inventive concept provides a liquid crystal display. The liquid crystal display includes a liquid crystal display panel, a backlight unit, a lower cover, an inverter board and an interconnection. The backlight unit includes a light guide plate to provide light to the liquid crystal display panel and a printed circuit board, on which a plurality of light emitting diodes are mounted to radiate light toward the light guide plate and a first connector is provided at one side of the printed circuit board. The lower cover may accommodate the liquid crystal display panel and the backlight unit, and has an interconnection installation hole formed at a position corresponding to the first connector.

The inverter board may be installed on a rear surface of the lower cover to apply a driving voltage to the light emitting diodes. The interconnection has one end, which may be connected to the inverter board, and an opposite end, which may be connected to the first connector through the interconnection installation hole.

A coupling part of the first connector coupled to the second connector is directed to the interconnection installation hole.

The first connector may be provided in a socket type and the second connector may be provided in a plug type.

The coupling part of the first connector may protrude from the rear surface of the lower cover through the interconnection installation hole.

A fixing member including thermal conductive metal may be provided on the lower cover to fix the printed circuit board.

As described above, according to the backlight unit and the liquid crystal display having the same of the disclosure, the printed circuit board may be easily connected to the inverter board, and the interconnection may be prevented from being broken during assembling work, thereby reducing the assembling time. Accordingly, the productivity and reliability of the liquid crystal display can be improved.

Embodiments of the present general inventive concept also provide for an image display apparatus, comprising a panel disposed in a direction to display an image, a light guide plate disposed in a direction to guide light in a second direction towards the panel, a printed circuit board having one or more light emitting diodes disposed to emit light in the direction, a lower cover mounted with a power unit disposed opposite to the light guide plate with respect to the lower cover, and a hole formed on the lower cover to connect the printed circuit board and the power unit.

Embodiments of the present general inventive concept also provide for an image display apparatus, comprising an upper cover and lower cover, a panel disposed between the upper cover and the lower cover, an optical film disposed between the panel and the lower cover, a light guide plate disposed between the optical film and the lower cover, a power unit disposed on the lower cover opposite to the guide plate, a printed circuit board having one or more light emitting diodes, and disposed to face a side of the light guide plate, a connector mounted on the printed circuit board and connected to the one or more light emitting diodes, a hole formed on the lower cover to correspond to the connector, and an interconnection disposed in the hole to connect the power unit to the connector.

BRIEF DESCRIPTION OF THE DRAWINGS

These and/or other features and utilities of the present general inventive concept will become apparent and more readily appreciated from the following description of the embodiments, taken in conjunction with the accompanying drawings, in which.

DETAILED DESCRIPTION OF THE EMBODIMENTS

Figure 1:
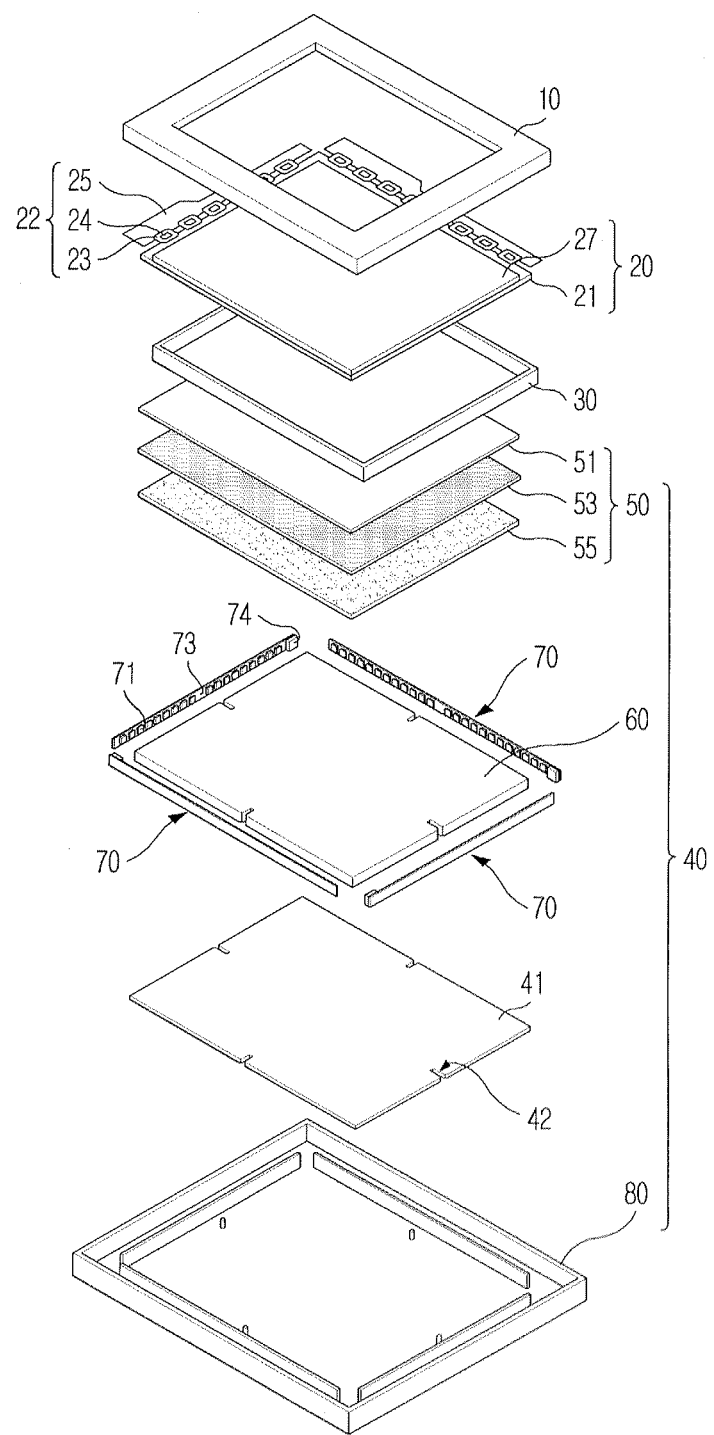
FIG. 1 is an exploded perspective view showing a liquid crystal display according to an exemplary embodiment of the present general inventive concept.

Reference will now be made in detail to the embodiments of the present general inventive concept, examples of which are illustrated in the accompanying drawings, wherein like reference numerals refer to the like elements throughout. The embodiments are described below to explain the present general inventive concept by referring to the figures As illustrated in FIG. 1, a liquid crystal display according to an exemplary embodiment of the present general inventive concept includes a liquid crystal display panel 20 and a backlight unit 40 disposed at a rear surface of the liquid crystal display panel 20.

The liquid crystal display panel 20 and the backlight unit 40 are accommodated between an upper cover 10 and a lower cover 80.

That is, the liquid crystal display panel 20 is mounted on a mold frame 30, and may be fixed on the backlight unit 40 by the upper cover 10, which is coupled to the backlight unit 40.

The upper cover 10 may be coupled to the lower cover 80 through a hook structure or a fastening member such as a screw.

The liquid crystal display panel 20 includes a thin film transistor substrate 21, on which a thin film transistor may be formed, a color filter substrate 27 facing the thin film transistor substrate 21 and a liquid crystal layer (not illustrated) provided between the thin film transistor 21 and the color filter substrate 27.

A driver 22 is provided at a side of the thin film transistor substrate 21 to apply a driving signal.

The driver 22 may include an FPC (Flexible Printed Circuit) 23, a driving chip 24 mounted on the FPC 23, and a PCB (Printed Circuit Board) 25 connected to one side of the FPC.

Although the driver 22 according to the exemplary embodiment is provided through a COF (Chip On Film) scheme, the disclosure is not limited thereto. According to another exemplary embodiment, the driver can be provided through a TCP (Tape Carrier Package) scheme or a COG (Chip On Glass) scheme, which are generally known in the art. In addition, according to another exemplary embodiment of the present general inventive concept, the driver 22 may be mounted on the thin film transistor substrate 21.

Such a liquid crystal display panel 20 forms an image by adjusting an alignment of the liquid crystal layer. However, the liquid crystal display panel 20 is a non-emissive device, so the liquid crystal display panel 20 requires light provided from the backlight unit 40 disposed at the rear surface of the liquid crystal display panel 20.

The backlight unit 40 may include a plurality of optical films 50 disposed at the rear surface of the liquid crystal display panel 20, a light guide plate 60 disposed at a rear surface of the optical films 50, a light source unit 70 disposed along both opposite sides of the light guide plate 60, and a reflection plate 41 disposed below the light guide plate 60.

The optical films 50 disposed at the rear surface of the liquid crystal display panel 20 may include a protection film 51, a prism film 53, and a diffusion film 55.

The diffusion film 55 may be provided with a base plate and a coating layer, which is formed on the base plate in a bead pattern such that light from the light source unit 70 can be diffused and then provided to the liquid crystal display panel 20.

The prism film 53 is provided at an upper surface thereof with triangular prisms regularly arranged such that light diffused by the diffusion film 55 is collected vertically to a plane of the liquid crystal display panel 20 disposed above the prism film 53. In general, two prism films 53 may be used, and micro prisms of each prism film 53 form a predetermined angle with each other. Most light passing through the prism film 53 travel vertically, thereby providing uniform light brightness.

The protection film 51 may be disposed on the prism film 53 to protect the prism film 53, which is sensitive to scratch or dust.

The light guide plate 60 includes acryl based resin, such as polymethylmethacrylate, or polymethylstyrene (copolymer of methylmethacrylate and stylene). The light guide plate 60 uniformly guides light from the light source unit 70 to the diffusion film 55.

The light source unit 70 may include a plurality of light emitting diodes 71 to generate light, a printed circuit board 73 on which the light emitting diodes 71 are mounted, and a first connector 74, which is formed at one side of the printed circuit board 73 and is connected to the light emitting diodes 71 to provide power to the light emitting diodes 71.

The light emitting diodes 71 may include a plurality of white light emitting diodes to emit white light, or may be provided in a combination of light emitting diodes to emit red light, green light, and blue light, respectively.

The printed circuit board 73 may be provided in the form of a metal PCB (Printed Circuit Board) including a silicon steel plate, a galvanized steel plate, or an aluminum disk which has superior thermal conductivity.

The printed circuit board 73 provides the driving signal to the light emitting diode 71 and emits heat generated from the light emitting diodes 71 to the outside.

Such a light source unit 70 may be installed at a position adjacent to the side of the light guide plate 60 to radiate light to the side of the light emitting plate 60. The light introduced to the side of the light guide plate 60 is transferred to the optical films 50 mounted on the light guide plate 60.

Although the light source unit 70 according to the exemplary embodiment of the present general inventive concept may be disposed around the light guide plate 60 adjacent to sides of the light guide plate 60, the disclosure is not limited thereto. According to another exemplary embodiment of the present general inventive concept, the light source unit 70 may be disposed at one side of the light guide plate 60 or may be disposed at two opposite sides of the light guide plate 60.

The reflection plate 41 is disposed below the light guide plate 60 such that light directed downward through the light guide plate 60 is reflected to the light guide plate 60. A reflection plate slit 42 is formed in the reflection plate 41 at a position corresponding to a fixing protrusion 82 such that the fixing protrusion 82 is inserted into the slit 65, wherein the fixing protrusion 82 formed on the bottom surface 81 of the lower cover 80 to fix the reflection plate 41 to the lower cover 80.

The reflection plate 41 may include plastic such as PET (polyethyleneterephthalate) or PC (polycarbonate).

The light guide plate 60, light source unit 70, and reflection plate 41 are accommodated in the lower cover 80, which accommodates the mold frame 30 and is coupled to the upper cover 10.

Hereinafter, the light guide plate and the light source unit accommodated in the lower cover will be described with reference to FIGS. 2 and 3.

Figure 2:
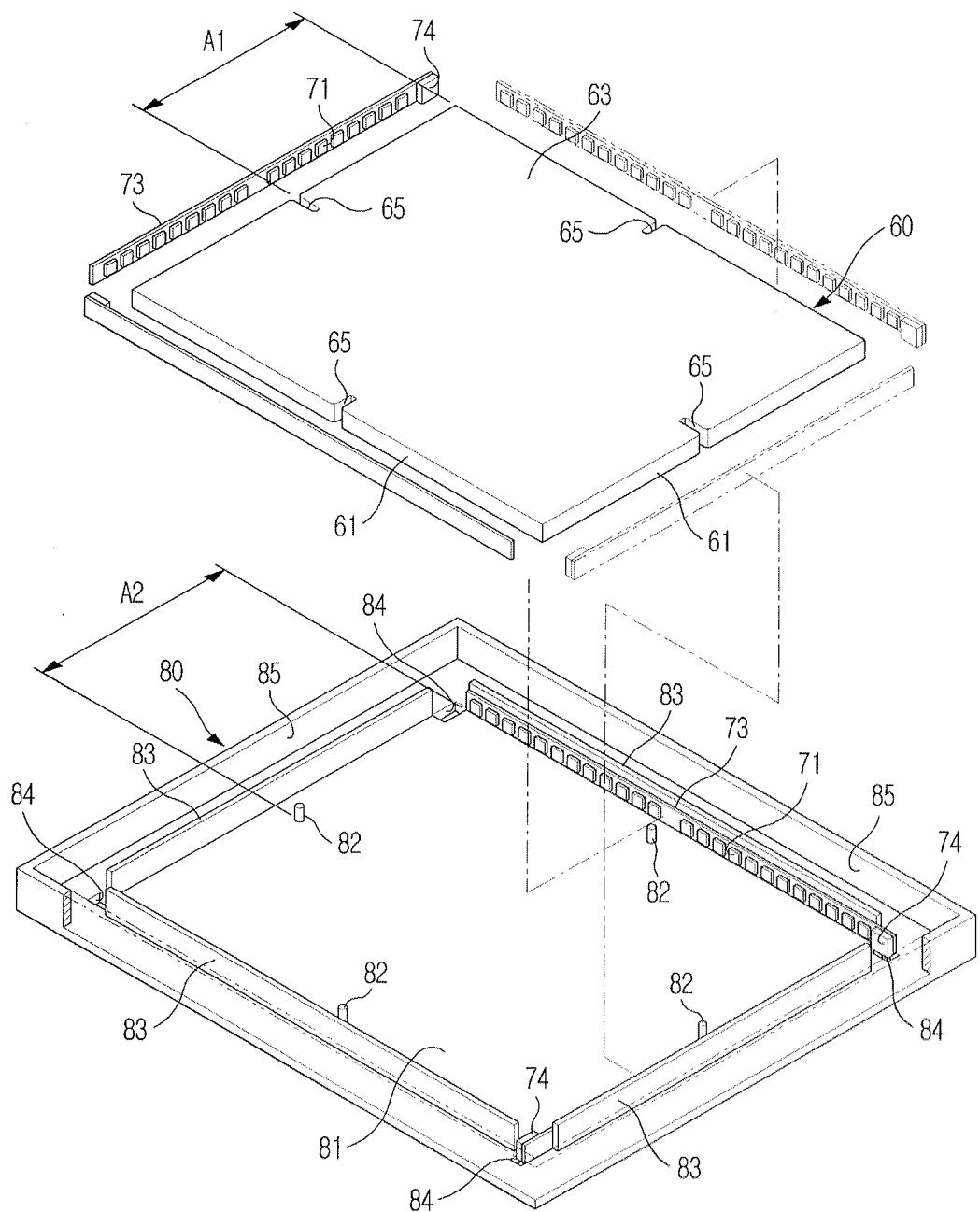
FIG. 2 is a perspective view showing a part of the liquid crystal display of FIG. 1.
Figure 3:
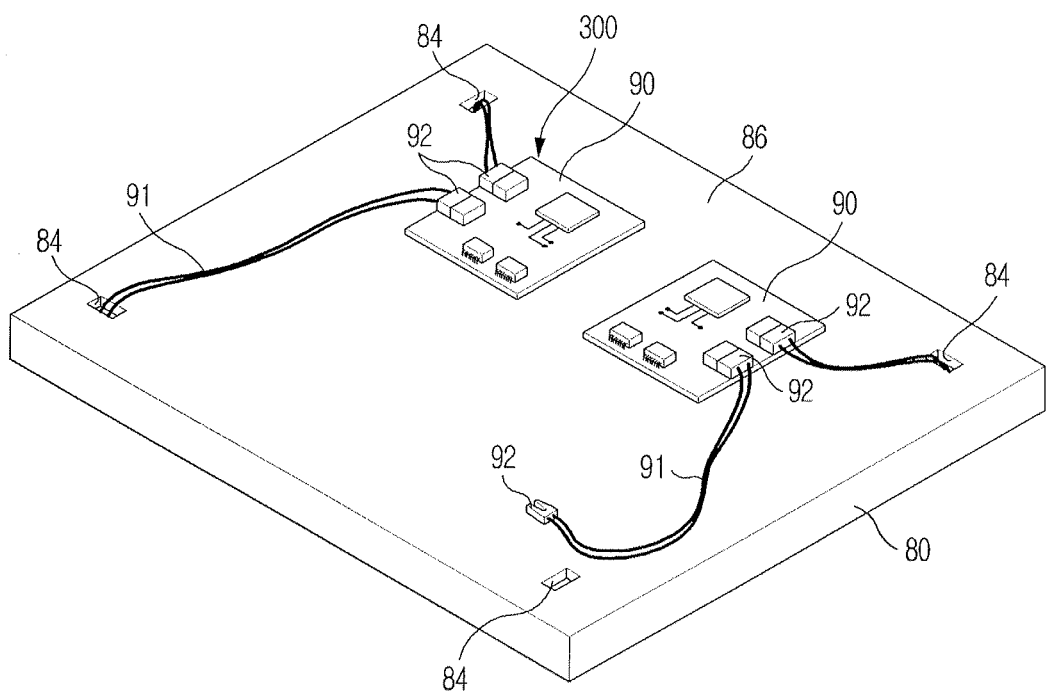
FIG. 3 is a perspective view showing a rear surface of a lower cover of the liquid crystal display according to the exemplary embodiment of the present general inventive concept.

FIG. 2 is a perspective view showing a part of the liquid crystal display of FIG. 1, and FIG. 3 is a perspective view schematically showing a rear surface of the lower cover of the liquid crystal display according to the exemplary embodiment of the present general inventive concept.

Referring to FIG. 2, the light guide plate 60 accommodated in the lower cover 80 may be provided in a rectangular shape having a predetermined thickness and faces the light source unit 70. The light guide plate 60 includes an incident surface 61 to receive light emitted from the light source unit 70, an exit surface 63 to discharge light introduced through the incident surface 61, and a reflection surface (not illustrated) facing the exit surface 63.

The lower cover 80 may be provided in a box shape having an open upper part. Such a lower cover 80 includes a bottom surface 81, on which the light guide plate 60 is mounted, and a sidewall 85 extending upward from the edge of the bottom surface 81 such that the light guide plate 60 and the light source unit 70 are fixedly accommodated within the sidewall 85.

A fixing protrusion 82 is formed on the bottom surface 81 of the lower cover 80 to fix the light guide plate 60 to the lower cover 80. A slit 65 is formed in the light guide plate 60 at a position corresponding to the fixing protrusion 82 such that the fixing protrusion 82 is inserted into the slit 65. A1 illustrates the distance between slit 65 and the end of the side edge of the light guide plate 60 which slit 65 opens up thereto. A2 illustrates the distance between fixing protrusion 82 and an end of a side edge of the bottom surface of the lower cover 80.

Therefore, when the light guide plate 60 is accommodated in the lower cover 80, the fixing protrusion 82 is inserted into the slit 65, so the movement of the light guide plate 60 is restricted.

Meanwhile, a fixing member 83 to install the light source unit 70 is provided at a position spaced apart from the sidewall 85 of the lower cover 80 to fix the light source unit 70 provided at a position adjacent to the incident surface 61.

The fixing member 83 faces the incident surface 61 of the light guide plate 60, and may include metal having superior thermal conductivity. Thus, heat generated from the light emitting diode 71 is transferred to the lower cover 80 through the fixing member 83 and then is discharged to the outside.

In addition, the fixing member 83 may be formed by fixing an extrusion member including aluminum to the lower cover

80. Otherwise, the fixing member 83 may be integrally formed with the lower cover 80.

The printed circuit board 73 of the light source unit 70 may be fixed to the fixing member 83 through a fastening member such as a screw or an adhesion member. Therefore, the light emitting diode 71 mounted on the printed circuit board 73 emits light toward the incident surface 61 of the light guide plate 60.

Although the light source unit 70 according to the exemplary embodiment of the present general inventive concept is installed on the fixing member 83, the disclosure is not limited thereto. According to another exemplary embodiment of the present general inventive concept, the light source unit 70 may be installed on the sidewall 85 of the lower cover 80.

The first connector 74 provided in a socket type may be installed at one end of the printed circuit board 73 to provide power to the light emitting diode 71.

A coupling part 75 (see FIG. 4) of the first connector 74 is directed to the bottom surface 81 of the lower cover 80. An interconnection coupling hole 84 is formed in the bottom surface 81 of the lower cover 80 at a position corresponding to the coupling part 75 of the first connector 74. The coupling part 75 refers to a part at which the first connector 74 is coupled to a second connector 92, which will be described later. That is, the coupling part 75 may be directed in a second direction crossing a first direction parallel with the bottom surface 81 of the lower cover 80. The second direction crossing the first direction may be perpendicular to the bottom surface 81 of the lower cover 80, but is not limited thereto.

Referring to FIG. 3, a power unit 300 is mounted on to the lower cover 80. The power unit 300 includes an inverter board 90, a second connector 92, an interconnection 91, and a second connector 92. The inverter board 90 and a PCB may be installed on the rear surface 86 of the lower cover 80. The inverter board 90 transforms external power such that the external power has a predetermined voltage level and then provides the transformed power to the light emitting diode 71. The PCB may convert an analog data signal into a digital data signal and provides the digital data signal to the liquid crystal display panel 20.

The inverter board 90 is connected to the light source unit 70 through an interconnection 91. The second connector 92 provided in a plug type may be installed at both ends of the interconnection 91.

Thus, one end of the interconnection 91 is connected to a connector mounted on the inverter board 90 and the remaining end of the interconnection 91 is connected to the socket type first connector 74 provided on the printed circuit board 73 through the interconnection coupling hole 84.

In general, the connectors 74 and 92 are connected to each other to provide electric connection. The plug type second connector 92 has a coupling protrusion, and the socket type first connector 74 has a coupling groove into which the coupling protrusion is inserted. Accordingly, if the coupling protrusion of the second connector 92 is inserted into the coupling groove of the first connector 74, the interconnection is electrically connected.

Although the exemplary embodiment of the present general inventive concept has been described wherein the socket type first connector 74 is installed on the printed circuit board 73 and the plug type second connector 73 is installed at the end of the interconnection 91, this description is for illustrative purposes only. According to another exemplary embodiment of the present general inventive concept, a plug type first connector may be installed on the printed circuit board 73 and a socket type second connector may be installed at the end of the interconnection 91.

Figure 5:
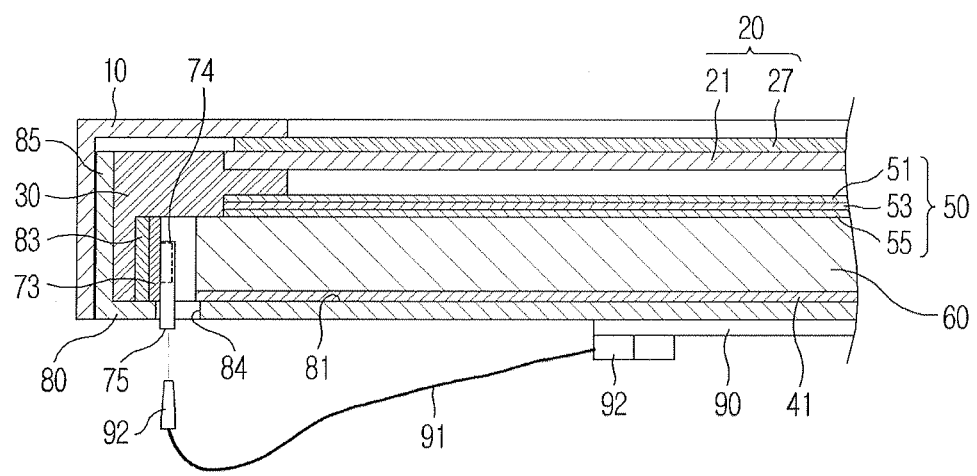
FIG. 5 is a sectional view showing a liquid crystal display according to another exemplary embodiment of the present general inventive concept.

In addition, the coupling part 75 of the first connector 74 installed on the printed circuit board 73 may be provided inside the lower cover 80. Otherwise, as illustrated in FIG. 5, the coupling part 75 of the first connector 74 may protrude out of the rear surface 86 of the lower cover 80.

Figure 4:
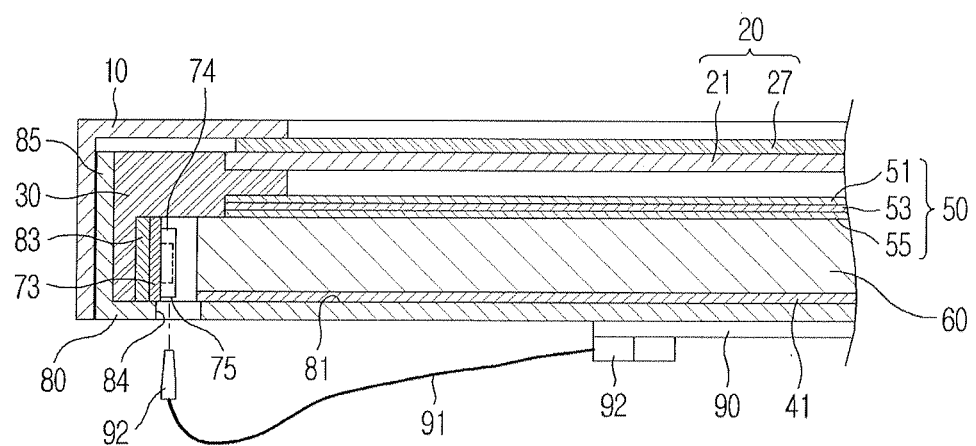
FIG. 4 is a sectional view showing the liquid crystal display according to the exemplary embodiment of the present general inventive concept.

Hereinafter, the assembling structure and operation of the liquid crystal display according to the exemplary embodiment of the present general inventive concept will be described with reference to FIG. 4. FIG. 4 is a sectional view showing the liquid crystal display according to the exemplary embodiment of the present general inventive concept.

First, the light source unit 70 is fixed to the fixing member 83 provided in the lower cover 80. In a state that the light source unit 70 is fixed to the fixing member 83, the coupling part 75 of the first connector 74 installed at the end of the printed circuit board 73 faces the bottom surface 81 of the lower cover 80, and the interconnection coupling hole 84 of the lower cover 80 is provided at a position corresponding to the coupling part 75 of the first connector 74.

After that, the backlight unit 40 is accommodated in a space formed in the sidewall 85 of the lower cover 80. In detail, the reflection plate 41 is mounted on the bottom surface 81 of the lower cover 80, the light guide plate 60 is mounted on an upper surface of the reflection plate 41, and the optical films 50 are mounted on the upper surface of the light guide plate 60.

The mold frame 30 is mounted on the backlight unit 40. The mold frame 30 is coupled to the lower cover 80 while supporting the edge of the light source unit 70, the light guide plate 60 and the optical films 50. Accordingly, the movement of the backlight unit 40 is restricted.

The liquid crystal display panel 20 is mounted on the mold frame 30. As the upper cover 10, which surrounds the edge of the upper surface of the liquid crystal display panel 20, is coupled to the sidewall 85 of the lower cover 80, the liquid crystal display panel 20 is fixed above the backlight unit 40.

After the liquid crystal display has been assembled, the plug type second connector 92, which may be formed at the end of the interconnection 91 connected to the inverter board 90, passes through the interconnection coupling hole 84 and then is coupled to the socket type first connector 92 installed on the printed circuit board 73.

Accordingly, the light source unit 70 is electrically connected to the inverter board 90 through the interconnection 91, so driving voltage may be transferred from the inverter board 90 to the light emitting diode 71.

Therefore, the interconnection 91, which is provided to connect the printed circuit board 73 having the light emitting diode 73 to the inverter board 90, passes through the interconnection coupling hole 84 and then is coupled to the inverter board 90 along the rear surface of the lower cover 80. As a result, the first and second connectors 74 and 92 may be prevented from being separated from each other when the liquid crystal display is assembled, so reliability of the liquid crystal display can be improved and the assembling process can be effectively performed.

In addition, the first connector 74 provided at one side of the printed circuit board 73 may be connected to the interconnection 91 at the rear surface 86 of the lower cover 80, so an additional space to connect the interconnection is not required inside the lower cover 80.

Further, as illustrated in FIG. 5, if the coupling part 75 of the first connector 74 protrudes from the rear surface 86 of the lower cover 80, the first connector 74 can be more easily connected to the second connector 92.

Although few embodiments of the present general inventive concept have been illustrated and described, it would be appreciated by those skilled in the art that changes may be made in these exemplary embodiments without departing from the principles and spirit of the present general inventive concept, the scope of which is defined in the claims and their equivalents.

What is claimed is:

1. An edge-type backlight unit, comprising:
   a light unit comprising:
      a printed circuit board having a plurality of light emitting diodes (LEDs) mounted on the printed circuit board; and
      a first connector formed at one side of the printed circuit board;
   a light guide plate having an incident surface to receive light from the plurality of LEDs;
   a lower cover provided with a bottom surface on which the light guide plate is accommodated, an interconnection coupling hole being formed through the bottom surface;
   a board disposed on a rear side of the lower cover, and configured to apply a driving voltage to the plurality of LEDs; and
   wherein:
   the first connector is provided with a coupling part; and
   the coupling part is adapted to face in a direction different from a longitudinal direction of the printed circuit board.

2. The edge-type backlight unit of claim 1, wherein the coupling part is directed to the interconnection coupling hole formed through the bottom surface of the lower cover.

3. The edge-type backlight unit of claim 2, wherein the interconnection coupling hole is formed at a position corresponding to the first connector, and the coupling part of the first connector is disposed to face the interconnection coupling hole.

4. The edge-type backlight unit of claim 1, further comprising: an interconnection having a second connector provided at an end thereof to electrically connect the printed circuit board to the board,
   wherein the coupling part is configured to be coupled with the second connector in a plug-in direction different from a longitudinal direction of the printed circuit board.

5. The edge-type backlight unit of claim 4, wherein:
   the interconnection passes through the interconnection coupling hole and is extended toward the first connector; and
   the second connector is coupled to the coupling part of the first connector in a direction perpendicular to the bottom surface of the lower cover.

6. The edge-type backlight unit of claim 4, wherein the second connector is coupled to the first connector via the interconnection coupling hole.

7. The edge-type backlight unit of claim 4, wherein:
   the first connector is a socket type first connector installed on the printed circuit board; and
   the second connector is a plug type second connector installed at an end of the interconnection.

8. The edge-type backlight unit of claim 4, wherein:
   the first connector is a plug type first connector installed on the printed circuit board; and
   the second connector is a socket type second connector installed at an end of the interconnection.

9. The edge-type backlight unit of claim 4, wherein the coupling part is disposed at an inside of the lower cover and couples the first connector to the second connector.

10. The edge-type backlight unit of claim 4, wherein the interconnection coupling hole is configured to allow at least one of the first connector and the second connector to pass through the interconnection coupling hole.

11. The edge-type backlight unit of claim 1, wherein the first connector protrudes from the rear side of the lower cover through the interconnection coupling hole.

12. The edge-type backlight unit of claim 1, wherein the plurality of LEDs is mounted along the longitudinal direction of the printed circuit board.

13. The edge-type backlight unit of claim 1, wherein the first connector and the plurality of LEDs are formed on the same side of the printed circuit board.

14. The edge-type backlight unit of claim 1, wherein the coupling part is directed in an outward direction of the bottom surface of the lower cover.

15. The edge-type backlight unit of claim 1, wherein the printed circuit board is fixed to a fixing member, the fixing member being provided on the lower cover and including thermally conductive metal.

16. A liquid crystal display comprising an edge-type backlight unit according to claim 1.

17. An apparatus having an LED edge-type backlight unit, the apparatus comprising:
   a display panel;
   a backlight unit illuminating light toward the display panel; and
   a driver being installed on a rear portion of the backlight unit and configured to supply a driving voltage to the display panel and the backlight unit;
   wherein the backlight unit comprising;
   a light unit having light emitting diodes (LEDs) arranged in a linear array on a printed circuit board in a first direction;
   a light guide plate receiving light from the LEDs;
   a cover having a bottom surface configured to support one of the light guide plate and the light unit and a hole being formed in the bottom surface;
   a wire electrically connecting the driver and the LEDs through the hole; and
   a connector being provided on the printed circuit board and configured to be coupled with the wire in a plug-in direction different from the first direction.

18. An apparatus as recited in claim 17, wherein the first direction is perpendicular to the plug-in direction.

19. An apparatus as recited in claim 18, wherein the plug-in direction is parallel to a light emitting direction of the LEDs.

20. An apparatus as recited in claim 17, wherein at least one portion of the connector is disposed in a space between the printed circuit board and the light guide plate.

21. An apparatus as recited in claim 17, wherein the hole disposed at a position corresponding to the connector.

22. An apparatus as recited in claim 17, wherein the connector and the plurality of LEDs are formed on a same side of the printed circuit board.

23. An apparatus as recited in claim 17, wherein the wire has a plug (male-end) and the connector has a jack (female-end) each having a front face where each front is aligned perpendicular to the plug-in direction.

24. An apparatus as recited in claim 17, wherein the printed circuit board is made with thermally conductive material.

25. An apparatus having an LED edge-type backlight unit, the apparatus comprising:
   a display panel;
   a backlight unit illuminating light toward the display panel; and
   a driver being installed on a rear portion of the backlight unit and configured to supply a driving voltage to the display panel and the backlight unit;

wherein the backlight unit comprising:
a light unit having light emitting diodes (LEDs) arranged in a linear array on a printed circuit board in a first direction where the printed circuit board is made with thermally conductive material;
a light guide plate receiving light from the LEDs;
a cover having a bottom surface configured to support one of the light guide plate and the light unit and a hole being formed in the bottom surface;
a wire electrically connecting the driver and the LEDs through the hole; and
a connector being provided on the printed circuit board and configured to be coupled with the wire in a plug-in direction different from the first direction.

26. An apparatus as recited in claim 25, wherein the plug-in direction is parallel to a light emitting direction of the LEDs.

27. An edge-type backlight unit comprising:
a light unit including a plurality of light emitting diodes (LEDs) grouped together in a first direction on a printed circuit board;
a light guide plate to receive light at a side portion thereof from the plurality of LEDs facing the side portion;
a metal cover being at a bottom portion of a light guide plate, the metal cover including a rear portion facing away from the bottom portion of the light guide plate, and including an opening therein to accommodate a wire;
wherein the wire includes an end portion to be coupled to the light unit in a second direction different from the first direction.

28. The edge-type backlight unit according to claim 27, wherein the first connector protrudes through the opening in the cover.

29. The edge-type backlight unit according to claim 27, wherein the second direction is a plug-in direction and the plug-in direction is parallel to a light emitting direction of the LEDs.

30. The edge-type backlight unit according to claim 27, wherein the printed circuit board is made with thermally conductive material.

31. The edge-type backlight unit according to claim 27, wherein the opening is formed as a hole shape.

32. The edge-type backlight unit according to claim 27, wherein the plurality of LEDs is grouped together in a linear array in the first direction on the printed circuit board.

33. The edge-type backlight unit according to claim 27, wherein the light unit further includes a first connector to receive the end portion of the wire in the second direction.

34. The edge-type backlight unit according to claim 33, wherein the wire includes a second connector at the end portion thereof and is coupled to the first connector.

35. The edge-type backlight unit according to claim 33, wherein the wire includes a second connector at the end portion thereof and is coupled to the coupling part of the first connector.

36. The edge-type backlight unit according to claim 27, wherein the first connector and the second connector are detachably coupled to each other.

37. The edge-type backlight unit according to claim 27, wherein the first connector includes a coupling part to be coupled with the end portion of the wire in the second direction.

* * * * *